US006490625B1

(12) United States Patent
Islam et al.

(10) Patent No.: US 6,490,625 B1
(45) Date of Patent: *Dec. 3, 2002

(54) POWERFUL AND FLEXIBLE SERVER ARCHITECTURE

(75) Inventors: Nayeem Islam, Thornwood; Trent Ray Jaeger, Croton-on-Hudson; Jochen Liedtke, Ossining; Vsevolod V. Panteleenko, North White Plains, all of NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,074

(22) Filed: Nov. 26, 1997

(51) Int. Cl.[7] .......................... G06F 15/16; H04L 12/00
(52) U.S. Cl. ....................................... 709/229; 709/105
(58) Field of Search ................................. 709/229, 213, 709/216, 201, 208, 105; 711/138; 364/230; 713/201; 395/187.01

(56) References Cited

U.S. PATENT DOCUMENTS

| | | | | |
|---|---|---|---|---|
| 4,839,798 A | * | 6/1989 | Eguchi et al. | 709/105 |
| 5,201,041 A | * | 4/1993 | Bohner et al. | 711/138 |
| 5,452,447 A | * | 9/1995 | Nelson et al. | 707/205 |
| 5,649,185 A | * | 7/1997 | Antognini et al. | 707/9 |
| 5,708,832 A | * | 1/1998 | Inniss et al. | 709/229 |
| 5,748,897 A | * | 5/1998 | Katiyar | 709/219 |
| 5,825,890 A | * | 10/1998 | Elgamal et al. | 380/49 |
| 5,864,852 A | * | 1/1999 | Luotonen | 713/201 |
| 5,892,914 A | * | 4/1999 | Pitts | 709/219 |
| 5,896,506 A | * | 4/1999 | Ali et al. | 709/213 |
| 5,915,095 A | * | 6/1999 | Miskowiec | 709/223 |
| 5,978,832 A | * | 11/1999 | Sirkin | 709/107 |
| 6,012,085 A | * | 1/2000 | Yohe et al. | 709/217 |

\* cited by examiner

Primary Examiner—Dung C. Dinh
(74) Attorney, Agent, or Firm—Wayne L. Ellenbogen; Anne Vachon Dougherty

(57) ABSTRACT

A server complex including at least one hit server with item cache, used to process read and write operations relating to cached items from clients, and at least one miss server, serving as a link to other servers (e.g., web servers, file system servers, and databases) for receiving requests relayed from the hit server(s) which relate to non-cached items and for responding to same. The hit server is a general-purpose, generic, component, which is independent of concrete applications and is basically responsible for the performance; while a miss server is a highly-customizable component, which is responsible for flexibility, and is application specific. The inventive architecture provides improved performance whereby a server complex achieves exceptionally high throughput rates for local services (i.e., services using items in the local item cache); flexibility, whereby a server complex can support the enforcement of a variety of application-specific policies for item management, authentication, and item consistency; security, whereby a server complex can enable the verification of the source, integrity, and freshness of communications over untrusted links; and, scalability, whereby a server complex is expandable by adding server components and implementing customized item consistency policies.

21 Claims, 6 Drawing Sheets

POWERFUL AND FLEXIBLE SERVER ARCHITECTURE

CROSS-REFERENCE TO RELATED INVENTIONS

The present invention is related to a co-pending application, assigned to the present assignee, Ser. No. 08/978,745, filed on even date herewith, and entitled "A Flexible Cache-Coherency Mechanism" now U.S. Pat. No. 6,032,228.

FIELD OF THE INVENTION

The present invention relates to client-server environments; and, more particularly to an improved scalable server architecture that can be used to build very large, application-specific, as well as general, servers for serving a large number of clients efficiently.

BACKGROUND OF THE INVENTION

For the future, it is envisioned that local networks will be serving from thousands to hundred of thousands of resource-poor clients. These networks might be intra-building, intra-organization or even intra-city. Customizable and nevertheless extremely high performing servers will be required. The low cost and variety of future client devices (e.g., PDAs, laptops, pagers, printers, and specialized appliances) will result in a larger number of client devices per user, such that each office employee may have dozens of client devices. So-called "thin clients" will have fast processors, with little or no disk storage, thereby requiring that most of their data and executables be downloaded from the server. Some typical applications for these clients will involve downloading of very large objects, such as graphics and video.

The existence of cheap client hardware having high-resolution graphics and high-quality audio, together with ubiquitous high-bandwidth networks, will probably lead to applications which make increasing demands on network and server performance. For a scenario with 10,000 users and 100,000 thin clients, requirements to the server complex will approximate the following demands: "handle 20,000 requests in a second with a data bandwidth of 1 GB's or higher."

Such postulated server-complex performance is about two orders of magnitude higher than that which current servers achieve. Improving current systems by evolution will not be sufficient. What is needed is a new server architecture to achieve the aforementioned goals. The basic requirements of the future architecture will be customizability, performance, scalability and security support.

Traditional servers are designed either to run a variety of applications, with abstractions that lead to poor performance; or run specialized applications efficiently, but without the flexibility to run other applications. In "Server operating systems," by Kaashock, et al, in the "Proceedings of the 1996 SIGOOPS European Workshops" (1996), a server operating system environment designed to provide abstractions for building specialized, high-performance servers is detailed. While the detailed server operating system enables improvements in server performance and flexibility, further improvement in performance is necessary without reducing the variety of server systems that can be developed.

It is an objective of the present invention, therefore, to provide a new server architecture.

It is another objective of the invention that the new server architecture be customizable, scalable and secure.

SUMMARY OF THE INVENTION

The foregoing and other objectives are realized by the present invention wherein a server complex is provided. The server complex includes at least one hit server with item cache, used to process client read and write operations related to cached items, and at least one miss server, serving as a link to other servers (e.g., web servers, file system servers, and databases) from which non-cached items can be obtained. Hit servers receive requests from clients, respond to clients, and send miss signals and coherency-related information to miss servers. Miss servers respond to these signals and control the hit servers.

Characteristic features of the inventive architecture are, first, to separate the hit server components from the miss server components, and second, to enable using multiple hit server and/or miss server components in a server complex. A further characteristic feature is that a hit server is a general-purpose, generic, component, which is independent of concrete applications and is basically responsible for the performance; while a miss server is a highly-customizable component, which is responsible for flexibility, and is intended to be application specific.

The invented server architecture has four major properties including: performance whereby a server complex achieves exceptionally high throughput rates for local services (i.e., services using items in the local item cache); flexibility, whereby a server complex can support the enforcement of a variety of application-specific policies for item management, authentication, and item consistency; security, whereby a server complex can enable the verification of the source, integrity, and freshness of communications over untrusted links; and, scalability, whereby a server complex is readily expandable by adding server components and implementing customized item consistency policies.

BRIEF DESCRIPTION OF THE DRAWINGS

The invention will now be described in greater detail with specific reference to the appended figures wherein.

DETAILED DESCRIPTION OF THE PREFERRED EMBODIMENT

Figure 1:
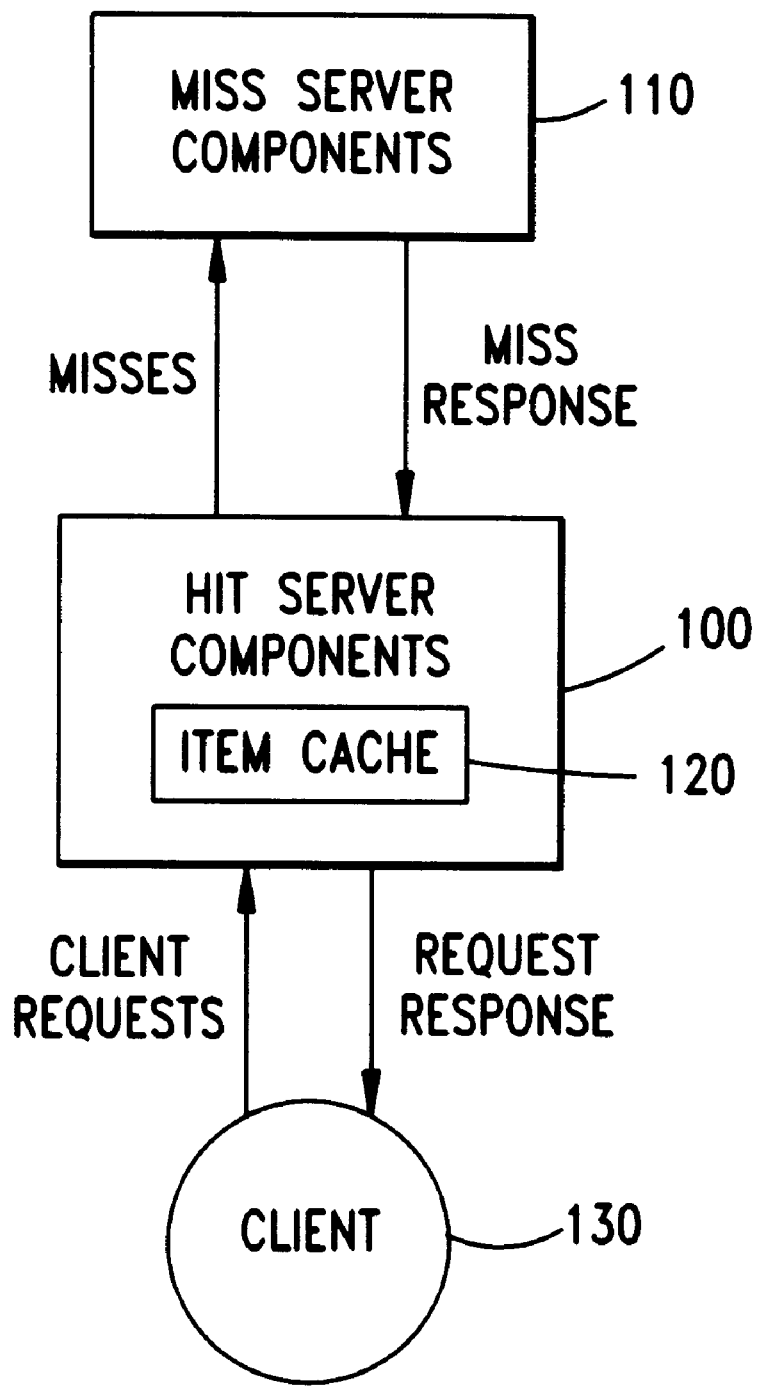
FIG. 1 illustrates one representative implementation of the inventive server architecture.

For the purposes of the ensuing description, the term "client: will refer to both a client machine and a client process, the term "server" will refer to a server machine; and, the term "server complex" will refer to a hardware/ software complex consisting of one or more machines that, as a whole, act as a server for the client(s). The design of an architecture for constructing high performance, customizable server complexes is presented. As illustrated in FIG. 1, a generic cache component (100), also called a hit server (100) with local item cache, is isolated from a customizable component (110), called a miss server (110). Single or multiple instances of the generic and the customizable components can be combined to build a general or specialized server complex, as further detailed below with reference to FIGS. 2–5.

For the generic cache component/hit server (100), main-memory caches of from 4 GB up to 64 GB are envisioned. The server complex software ideally maintains the cache, does not restrict the customizability, supports scaling of multiple components, and is nevertheless highly specialized and optimized to achieve the demanded high throughput.

Figure 2:
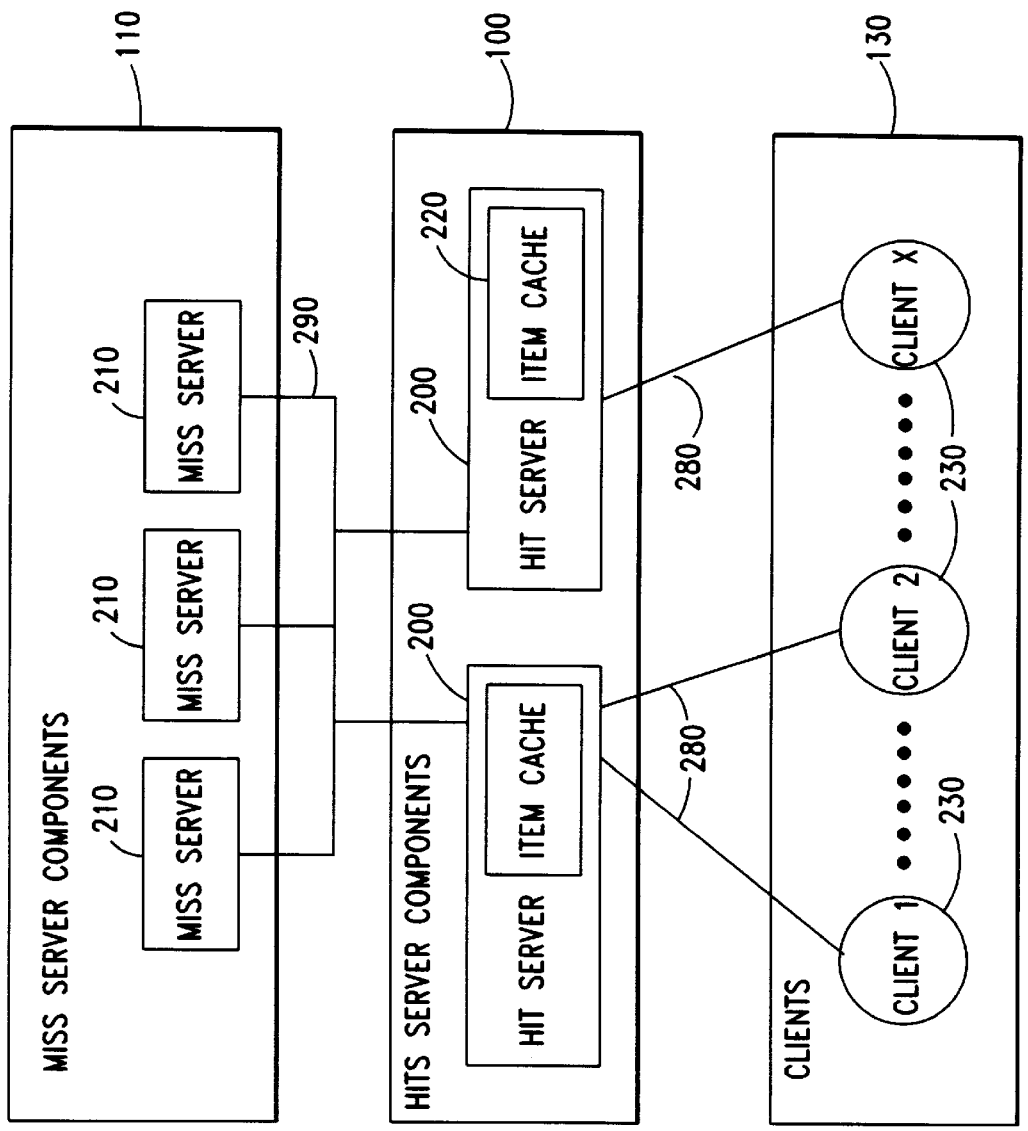
FIG. 2 shows an alternative server complex, in accordance with the invention, consisting of three miss servers, two hit servers and a server-interconnection system.

FIG. 1 depicts the server architecture which consists of two types of components that cooperate to manage a large, preferably RAM, cache of items. A hit server (100) is a highly-optimized generic component that handles requests from client 130 that "hit" (i.e., are found) in the item cache (120). A miss server (110) handles client (120) requests that "miss" (i.e., are not stored) in the item cache (120). Miss servers (110) also implement application-specific policies for managing the hit server item cache (120) and the distribution of items (323) to clients (130). FIG. 2 depicts a server complex comprising a plurality of different or identical miss servers (210) associated with a plurality of hit server components (200). Also possible are server complexes combining a single miss server and a plurality of hit servers, combining a plurality of miss servers and a single hit server, or combining a single miss server and a single hit server.

Hit Server

Figure 3:
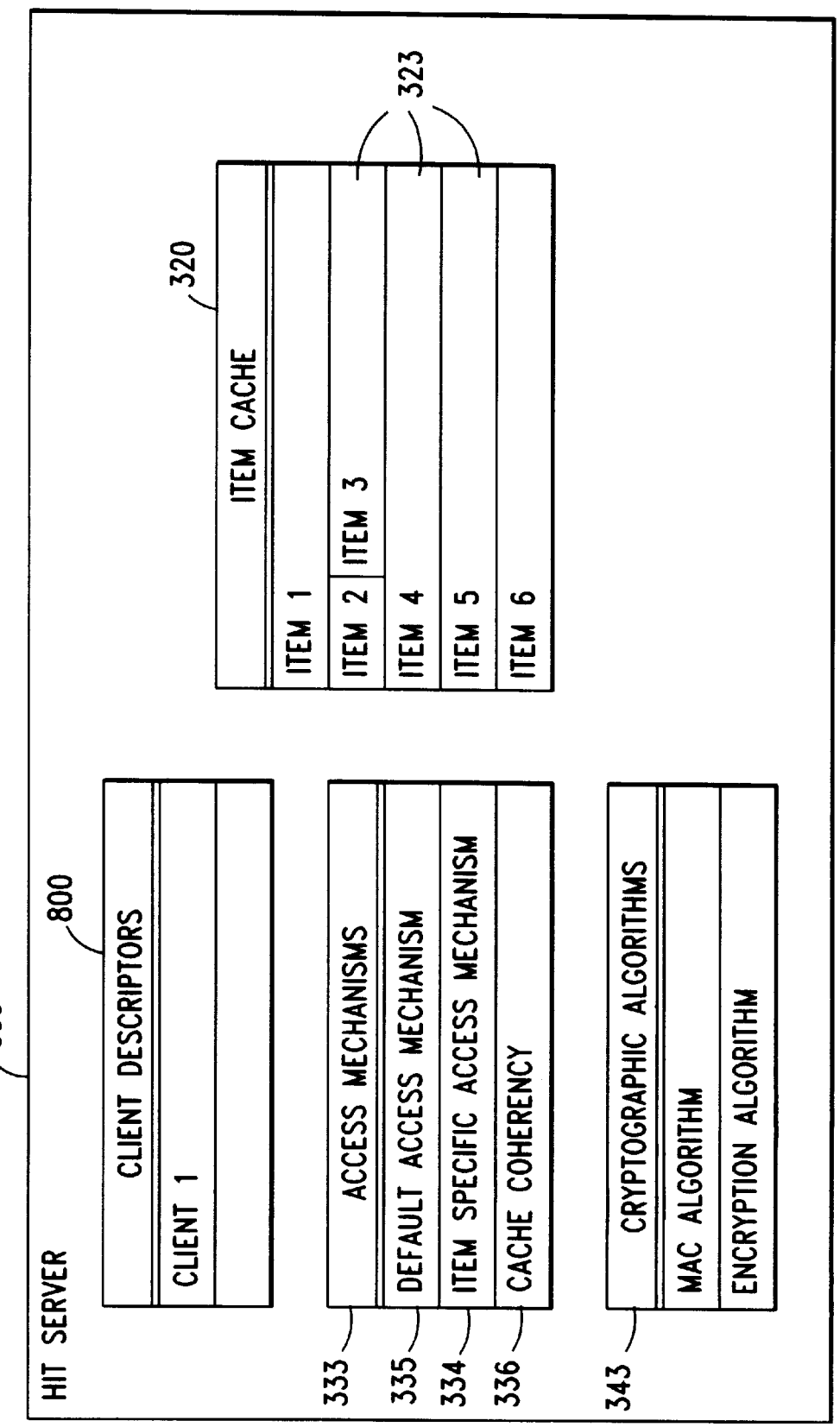
FIG. 3 shows a logical representation of a hit server component which has an item cache, client descriptors, general mechanisms, access algorithms, and cryptographic algorithms.

A logical representation of one implementation of a hit server 300 is illustrated in FIG. 3. By way of example, the hit server may comprise an off-the-shelf PC, equipped with a 200-MHz PentiumPro* uniprocessor, an Intel* chipset, and 256-K of L2 cache memory for item cache $320^1$. External devices (not shown) may be connected to the processor and the memory by a bus (such as a 32-bit PCI bus with a cycle time of 30 ns). The hit server may be built on top of any standard operating system (e.g., Linux*, Unix*, Windows NT*), although performance heavily benefits from use of the preferred L4 microkernel. In an experimental setup, 7 Ethernet controllers were used as an inexpensive solution which was sufficient for high-load experiments. As more than 7 cards could not be plugged into the prototype hardware for mechanical reasons, six 100-Mbps Ethernets connected the hit server to its clients, and one Ethernet connected to the miss servers.

[1] *Indicates Trademark of respective owner

For increased numbers of miss server and hit server components in an server complex, the inter-server network hardware can be upgraded to include multiple Ethernets for point-to-point connections, an ATM switch, or a Myrinet*. Since the inter-server network connects only 2 to perhaps 15 nodes, the related costs are economically feasible. Although standard protocols like TCP/IP could be used for hit server/client communication and hit server/miss server communication, the preferred embodiment uses an efficient lightweight protocol with increased performance. Encrypting of communications, such as with message integrity codes, can additionally be implemented to ensure integrity of communications between entities.

Figure 4:
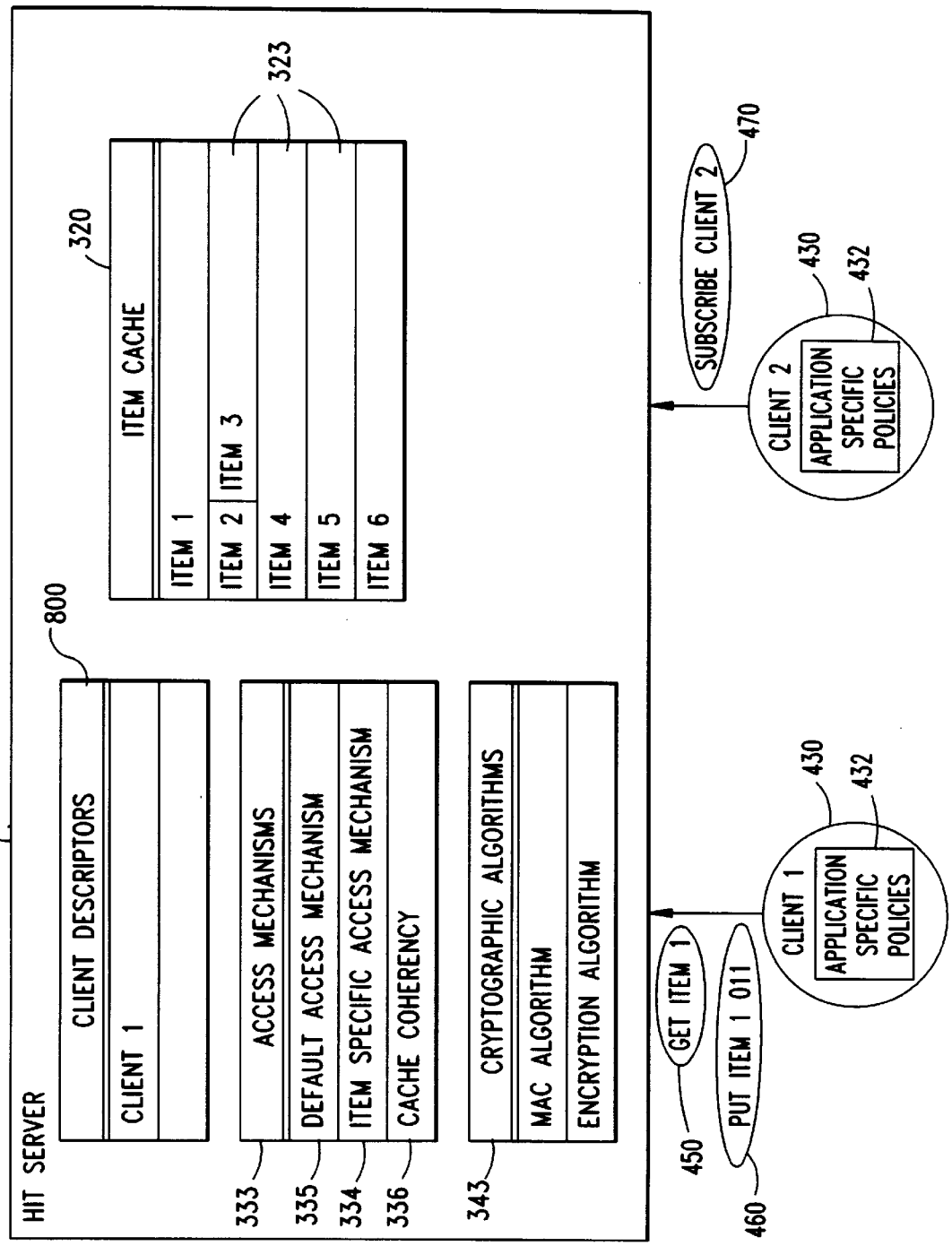
FIG. 4 illustrates a logical representation of a hit server component of the present invention receiving requests to read arbitrary intervals of items and to write arbitrary intervals of items.

With reference to FIG. 3, which depicts the hit server internals, and FIG. 4, which depicts client operations on items stored in the item cache 320 of the hit server (300), an item (323) consists of data and a set of access mechanisms (333) that act on the data. Table I illustrate the item information which may be stored in the item cache 320 for each item 323.

TABLE 1

Item Descriptors

| Item | Descriptor Attributes | Definitions |
| --- | --- | --- |
| 700 | Name | Item's name (unique) |
| 710 | Version Number | Item's version number |
| 720 | ACL | Access control list |
| 730 | Get Operation | Pointer to custom get operation |
| 740 | Put Operation | Pointer to custom put operation |
| 750 | Status Data | Accessed and dirty bits |
| 760 | Consistency Matrix | Item consistency requirements |
| 770 | Miss server | Miss server used for notification |
| 780 | Data Descriptors | List of item page descriptions (data) |

As with HTTP, clients (430) read or write items by invoking the "get" (450) or "put" (460) (referred to as "post" in HTTP 1.1) operations, respectively. These operations permit clients (430) to download or modify the entire item (323) or arbitrary, selected parts of the item (i.e., as opposed to reading or writing the entire item). Furthermore, items (323) can have item-specific "get" and "put" operations (334) which have been previously supplied by the item creator. "Get/put" operations manipulate items based on the information in the item descriptor structure (700–780). As example, a custom "get" can present an item in different formats based on the identity of the requesting client. Such stored customized, item-specific operations enable an item and its presentation criteria to be collectively cached, which can improve the probability of a later cache hit. Most items (323) will probably use default implementations (335) of the "put" and "get" operations which simply deliver and update the item data (780). Cache coherency mechanisms (336) for maintaining consistency among multiple stored copies of cached items are described later.

Upon a client request, with reference to FIG. 4, the hit server (300) locates the requested item (323) and either downloads it to the client (430) in response to a "get" request, creates a new version in response to a "put" request, or forwards the request to the miss server if the item is not stored at the item cache (320).

The hit server is free of policy. Its general mechanisms are intended to support any policy that the miss servers can implement, so developers can create application-specific server systems. For example, with reference to FIG. 5, if cache replacement is signaled by the hit server (300) (e.g., on a cache miss), the miss server (510) is free to select the items (323) to be replaced. If desired, one can implement the system such that the miss server can only operate on those cached items which it inserted into the cache, or otherwise restrict access to stored items (e.g., allow access to cached items only to certain ones of the plurality of miss servers). For the preferred embodiment, a library of miss server routines was collected which included general miss server primitives and a set of functions that use these primitives to implement predefined policies. However, the developers can choose to build a miss server from any combination of predefined and custom policies or even build a new miss server from scratch.

In operation, the client makes the following types of requests to the hit server (300) (see FIG. 5): "get" (450), "put" (460), and "subscribe" (470). If the integrity of the communication channel (503) between the client and hit server is questionable, all requests can include authentication information to verify the sender, the integrity, and the freshness of the request. "Put" and "get" requests enable clients to download arbitrary intervals of a specified item's data (see Table 1). Both operations take name, version number, and offset-size pairs as arguments. An item (323) is identified by its name (700). The hit server (300) is name-scheme neutral, but the item names (700) must be unique. Example name formats include file path names, URLS, and database queries. The version number (710) argument indicates the latest version possessed by the client. On a "get" request (450), if the current stored item version is the same as the version number in the request, only a simple acknowledgement need be returned by the hit server. A "put" operation (460) is only applied if the version number in the request is the same as the item's current version number (710). Offset-size pairs enable specification of a set of intervals to retrieve or update.

In the preferred embodiment, all items (323) in principle support "put" and "get" requests. These can be the hit server predefined default "get/put" operations (335) or item-specific operations (334). A successful "put" or write operation (460) results in a new version of the item being cached and a new version number for the item being returned. A successful "get" (426) returns the requested item data or, as noted above, an acknowledgement signal.

The semantics of the "get" and "put" operations are also modified from HTTP 1.1 to enable more flexible control on cache misses. On a "get/put" miss, the hit server (300) informs the client (430) that the item (323) is not yet available, and relays the request information to the miss server, as further detailed below. The hit server (300) then informs the client (430) when it receives the requested item data, so that the client can resend the "get/put" request. This semantic modification enables clients to build application-specific policies (432) for dealing with cache misses on top of the "get/put" protocol. The default policy is implemented by a "blocking-get" operation that blocks the client until the request is fulfilled. However, the client could alternatively choose to inform the user that the item is being retrieved and permit other processing until the item is available.

The default "get" operation is as follows:
get (client, name, client's version, offset-size pairs):
  Locate item from name ;
  IF item not in cache
    THEN signal to miss server; Return miss acknowledgement
  FI ;
  IF client is not authorized for get by item's ACL ;
    THEN Return authorization failure ;
  FI ;
  Invoke item's consistency action (for get);
  IF Item's version number is the same as the client's version
    THEN Return empty acknowledgement;
  FI ;
  IF customized get specified
    THEN invoke custom get on item and client descriptor
  FI ;
  Return item data referred to by offset-size pairs to client.

After verifying that a download is necessary by checking version numbers, the client is authorized against the item's ACL (720). Next, the item's status data (750) and consistency matrix (760) may indicate that the item's miss server (770) be signaled, so it can implement the item's consistency policy (as further detailed below). Finally, the hit server sends the requested item data (780) to the client.

The default "put" operation is as follows:
put (client, name, client's version, offset-size pairs, data):
  Locate item from name
  IF item not in cache
    THEN signal to miss server; Return miss acknowledgement
  FI ;
  IF client is not authorized for put by item's ACL ;
    THEN Return authorization failure ;
  FI ;
  IF Item's version number is not the same as the client's version
    THEN Return version failure;
  FI ;
  Create a new version of item using offset-size pairs and data
  IF customized put specified
    THEN invoke custom put on item and client descriptor
  FI ;
  Return new item version number .

The "put" operation is similar to the "get" operation except that a "put" creates a new copy of the item with an incremented version number for the item and returns that version number to the client.

The present inventive architecture also enables flexible handling of items (323) through item-specific "get/put" operations, 334. These operations are specified in the item's "get" operation (730) and "put" operation attributes (740), respectively. An item-specific operation supersedes a default operation. Item-specific "get/put" methods (334) are run on the hit server (300) to enable efficient implementation of well-written custom operations. An item-specific "put" operation is invoked after the new data is received, but prior to updating the item cache (320). An item-specific "put" can be used to implement item-specific consistency protocols that are executed when an update is made. An item-specific "get" operation is invoked prior to delivery to the client. An item-specific "get" can be used to deliver modified item data to a client (e.g., for displaying the item effectively on the client). Both can use the client descriptor (800 below) and item descriptor attributes (700–780) as input.

Figure 6:
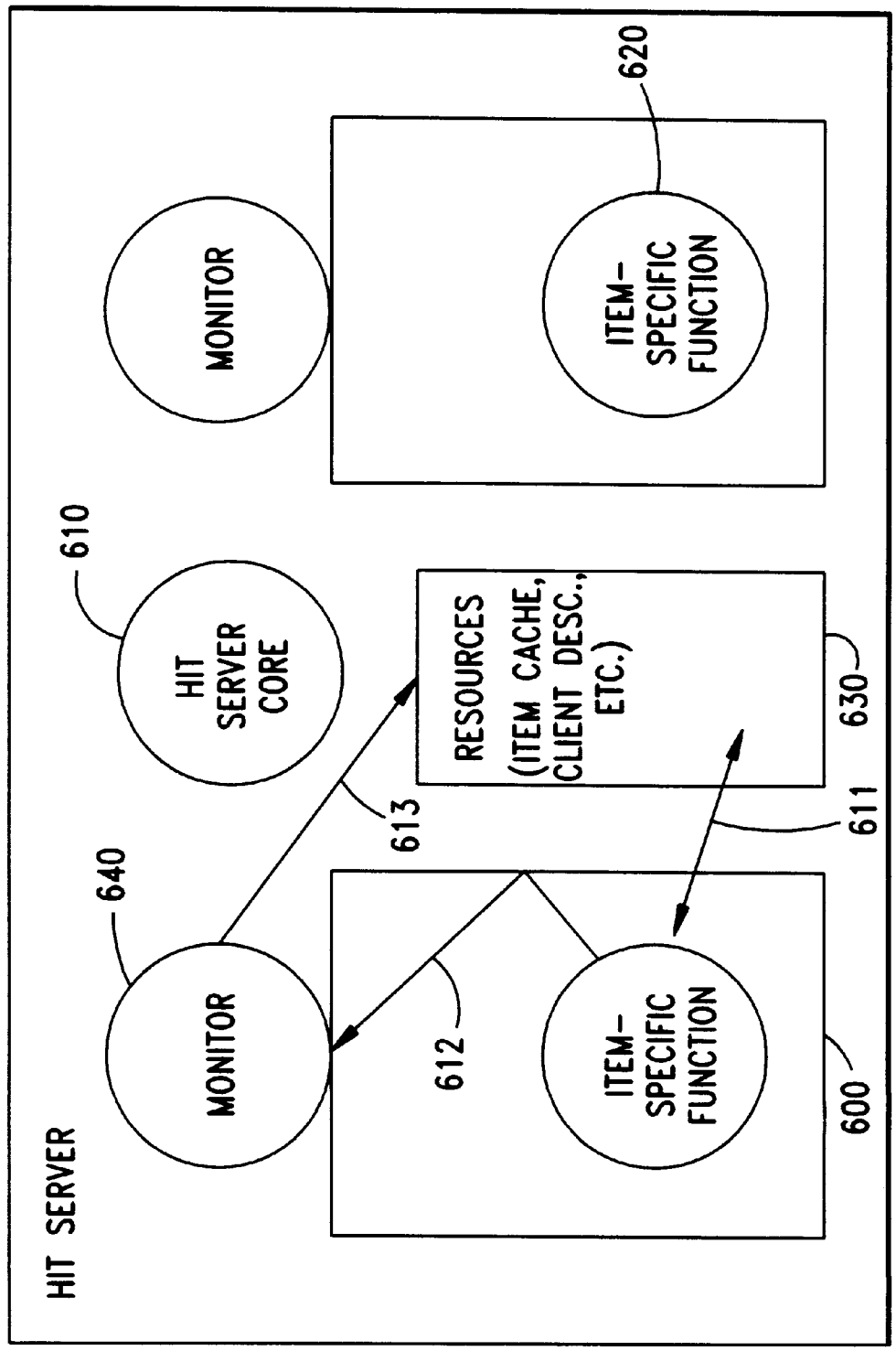
FIG. 6 shows an item-specific access algorithm being run in a separate address space at the hit server of the present invention and having its accesses monitored.

In order to prevent corruption of the hit server and denial-of-service to clients, the hit server must control these item-specific "get/put" operations (334). Each item-specific "get/put" operation is assigned to its own address space (600 as shown in FIG. 6) to protect the hit server core (610) and other item-specific operations (620) from modification. Resources (630), such as the item and client descriptors, are protected by a monitor (640) that intercepts and authorizes requests to them (the request is shown by the dark line (611) and the thin lines (612 and 613) show the operation path). For example, item-specific operations are permitted to read the requesting client's descriptor and the requested item descriptor.

Clients use "subscribe" (470) to create and obtain client descriptors, 800 in Figures. A client descriptor (800) contains an application-specific representation of the client and of the secrets shared between the client and the hit server. The client descriptors (800) can be used by item-specific "get" (450) and "put" (460) operations, as well as for miss server policy. Table 2 provides a representative listing of client descriptors, below. The hit server maintains client descriptors (800) for each subscribed client. The preferred embodiment of these structures is shown in Table 2 (810–870). The attributes CVerify (850) and CGenerate (860) hold functions for verifying and creating authentication data using the shared secret (820), respectively. The description attribute (870), supplied by the client upon a "subscribe" request (470), is used for item-specific "get/put" operations (see foregoing descriptions).

TABLE 2

Item Descriptors

| | Client Attributes | Definitions |
|---|---|---|
| 810 | Name | Client's name (unique) |
| 820 | Secret | Secret shared with the client |
| 830 | Public Key | Client's public key |
| 840 | Counter | Number of pseudorandom function applications on secret |
| 850 | CVerify | Option for verifying authentication info |
| 860 | CGenerate | Option for generating authentication info |
| 870 | Description | Ad hoc client data |

In addition to processing client's "get", "put" and "subscribe" requests, the hit server processes miss server "insert/ delete" requests (550,560 of FIG. 5) to modify the item cache. Furthermore, miss servers add client descriptors via register (570) operations to hit servers. The hit server (300) supports the use of secure communication channels using cryptographic algorithms (343). Requests that result in cache misses are forwarded to the miss server. In addition, "subscribe" requests (470) are forwarded to the miss server, although the resulting client descriptors (800) are stored by the hit server.

A hit server (300) processes miss server-invoked operations, "insert" (550) and "delete" (560), that insert or delete an item (specified by name and version) into/from the item cache (320). An "insert" operation enables the miss server (510) to set the initial values for the item's attributes. Client descriptors are stored using a "register" operation (570) (e.g., as the result of a "subscribe" (470)).

If a miss occurs upon a client-invoked "get/put", the hit server (300) can propagate this miss (a) to a specific miss server (510) that the hit server determines from the requested item's name, or (b) multicast it to a group of miss servers that the hit server determines from the requested item's name, or (c) broadcast it to all the miss servers registered with it, or (d) propagate it to a specific miss server that is responsible for all misses on items whose corresponding miss server is not known, and which in turn will determine the appropriate corresponding miss server and propagate the miss to it.

Miss Server

A miss server (510) implements the server system's policy upon "get/put" misses (including notifications) and "subscribe" operations. To ease the task of building application-specific miss servers, the architecture provides set of miss server primitives and functions built using those primitives that can enforce some predefined, application-specific policies. In general, the miss server architecture places no limits on the policy that can be defined. Below are described the miss server primitives, and how developers can build custom miss servers using a default miss server event loop and supporting functions.

In the preferred embodiment, miss servers have three primitive operations: "insert" (550), "delete" (560), and "register" (570). A miss server (510) stores or removes items (323) from the item cache (320) using "insert" (550) or "delete" (560), respectively. The "register" (570) operation is the response to a client's "subscribe" (470) operation. The "register" (570) operation uploads a client descriptor (800), based on a "subscribe" (470) request from the client for storage at the hit server.

Default miss handling is implemented by the serve_miss operation:

serve_miss (name, version):
    Get-item with name and version from appropriate object server;
    IF item type requires authentication
        THEN authenticate the item data ;
    FI
    Create an item descriptor for the downloaded item ;
        Set_ACL, set_consistency, set_authenticate, set_ schedule, etc.
    for the item descriptor;
    Insert item descriptor in the hit server item cache (delete a current item descriptor, if necessary);
    Prefetch related items, if appropriate.

Specifically, the miss server (510) determines the item's type and uses the "get-item" operation for that type to download a copy of the item's data with the specified name and version. Depending on the downloaded item's type and item server, it may need to be authenticated. The miss server (510) then creates an instance of a item descriptor (see Table 1) for the downloaded item data (780). A function is provided for each of the item descriptor's attributes (700–780) to compute its value (called set_x where x is a item descriptor attribute). The miss server (510) uses these functions to implement an appropriate application-specific policy for deriving the values of these attributes. Thereafter, the item descriptor is stored in the hit server's item cache (320). If necessary, the miss server executes the "replace" operation to determine items to delete to make room in the cache. Ultimately, "delete" (560) is called to remove the supplanted item descriptors, and "insert" (550) is called to insert the newly created item descriptor. Lastly, the item download may require that the miss server prefetch other related items, which action will be automatically undertaken by the miss server.

Two techniques are used for expressing policy to the serve_miss function and its subroutines: (1) specify policy options known by the miss server and (2) provide custom versions of policy operations. For each operation, the miss server understands a set of predefined options. The function select_x is called to choose a policy option for operation x from a set of pre-defined miss server policies. For example, the select_ACL option read-only for all clients can be selected as the default ACL value (720) for all items (323). If a custom policy is necessary for an operation, then the application developer can specify this policy by implementing it in a function called custom_x (where x is the operation). For example, under certain conditions, a custom_ACL function may be called to compute an item's ACL (720) instead of using the default. These functions take the item descriptor and client descriptor's description as arguments. The default miss server event loop supports only one custom policy function per operation.

Figure 5:
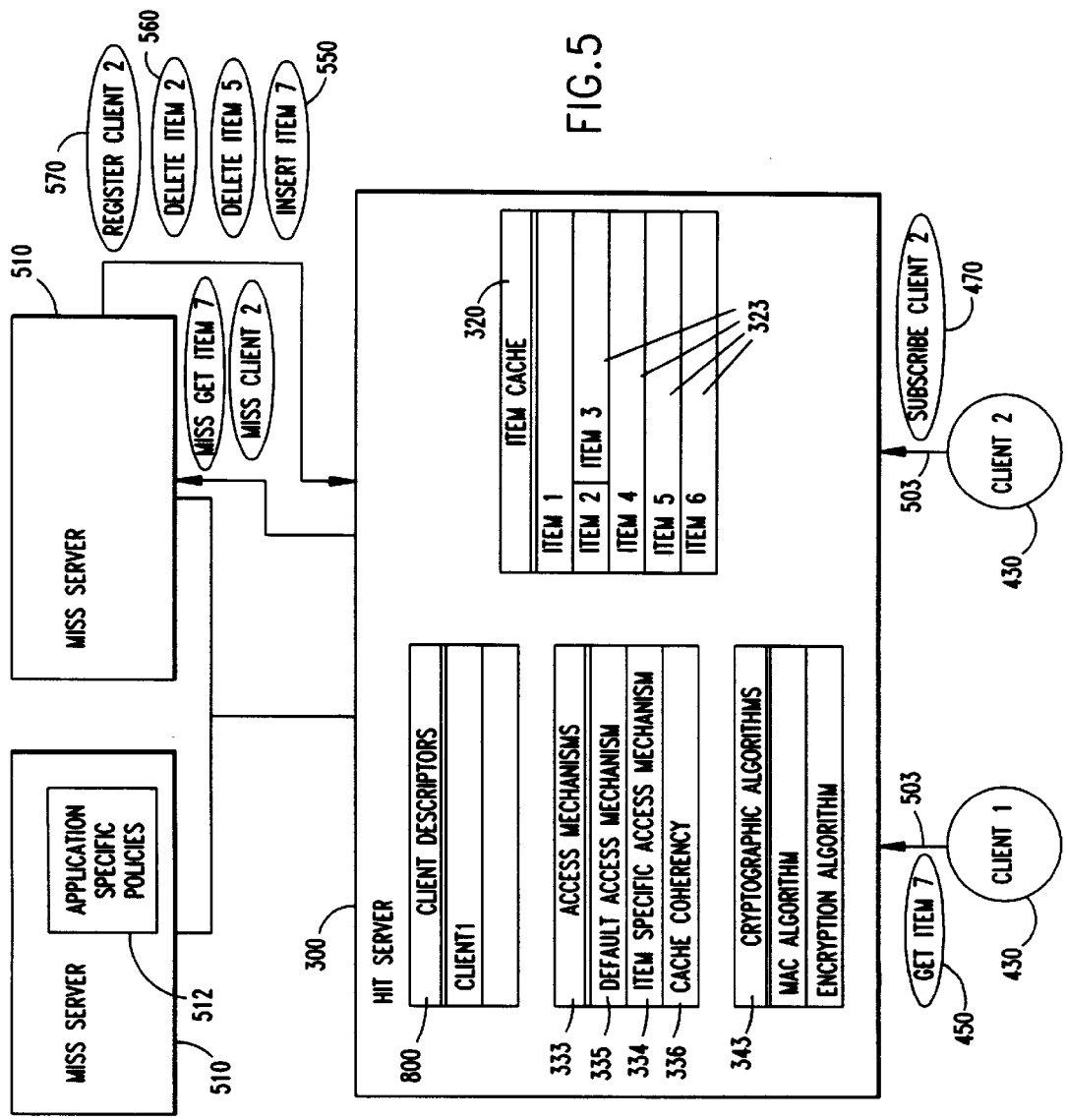
FIG. 5 illustrates a logical representation of hit and miss server components and interactions in the server complex, in accordance with the present invention.

By way of example, and with reference to FIG. 5, Client1 has issued a "get" request for Item 7 while Client2 has issued a "subscribe" request. Since Item 7 is not available at the Item cache 320, the hit server 300 notifies the miss server 510 of the miss. The miss server invokes the operation "InsertItem7"; and, since room must be made in the Item cache 320 for Item7, the miss server also conducts any necessary "delete" operations, specifically shown as "deleteItem2" and "deleteItem5." The hit server also notifies the miss server of the "subscribe" request. Miss server 510 invokes a "register" operation to register Client2, with the client descriptor information being returned to the hit server for storage.

Server-Component Interconnection System

The mentioned server components, hit servers and miss servers can be interconnected in any of the following ways: by one or more open or private networks; by one or more closed networks that are used only for connecting the server components; by one or more bus systems; by one or more shared memories; or, by a combination of these variants. The preferred server-component interconnection systems (290) are closed systems (i.e., closed networks, bus systems or shared memories) that are solely used by the server components. Such systems have two basic advantages over open networks: (1) integrity and privacy are not a problem for the server-component interconnection system; and, (2) potential throughput is higher. The server-client interconnection system (280) need not be a closed network. However, it must support the delivery throughput of the hit server or at least the throughput requirements of its clients.

A physical machine can run more than one server component. Although, in general, this results in lower performance than using one machine per component, in some cases it might be of interest, since combining multiple components on one machine requires less hardware or can utilize special hardware, e.g. on a massively parallel machine. One example of the foregoing is to run a hit server (100) and a miss server (110) on the same dual-processor machine, where both components are connected via shared memory (290).

One of the invented architecture's most attractive features is that miss servers (110) and hit servers (100) can be scaled to handle more clients and increase server throughput. This is achieved by combining multiple hit and miss servers to compose a single server complex. Scalability is aided by an explicit separation of miss server and hit server hardware and functions, such that miss server CPU and IO consumption does not degrade hit server throughput. Miss handling only influences the throughput of the hit server when the miss server stores an item into the item cache of the hit server. Further, in contrast to the client-server network (280), the inter-server connection hardware can easily be upgraded to a faster network (ATM, Myrinet or PCI bus) without incurring higher overall system costs since typically there are only a few server machines. Increasing the number of miss servers can be effective to increase the total miss server performance and/or to ease the miss handling for different types of items. For the latter purpose, for example, one or more miss servers could be dedicated for items that are conventional files, other miss server(s) for items that are WEB objects, still other miss server(s) for items that are video clips, etc. When multiple hit servers are used, it must be ensured that "put" operations (460) to shared items do not violate the item's consistency requirements. A variety of item consistency requirements have been shown to be effective for different applications. Also, server performance may benefit from the use application-specific policy in a consistency protocol. For these reasons, the hit server provides a basic consistency mechanism (336) from which "per item" consistency protocols can be implemented by the miss server(s).

Unlike a hardware bus, snooping-based solutions for coherency are not possible for a LAN. Packets can arrive at arbitrary times and be available for arbitrary time intervals on an Ethernet. Therefore, a snooping protocol may miss packets that are processed properly at their destination. As an alternative, the miss servers are used as arbiters. Conflicting accesses to an item are coordinated by the miss server that owns the item.

In the preferred embodiment, a basic consistency mechanism (336) is provided by the hit server, as described in the aforementioned co-pending patent application, entitled "A Flexible Cache-Coherency Mechanism." In the single hit server (100) case, classical write-through or write-back items can be used. Some miss servers (110) might even prefer a do-not-care policy that permits any operation without even signaling it to the miss server. The miss server can instead retrieve the item's state (750) when replacing or removing it. When using multiple hit servers, effectively managing write-shared items is important. The write-shared-master policy solves this by propagating all requests (get-through/put-through) to the write-shared master. This could be a normal miss server or a hit server that serves as a miss server for write-shared items. Further "put" policies are MESI (Modified, Exclusive, Shared, Invalid) or the various release consistency policies.

Example Server Systems

1. Instructional Server

An instructional server delivers instructional guidance for some pre-defined context to clients. Examples of such a system include: (1) museum kiosks; (2) retail services (e.g., mall, information resources); (3) educational. services (e.g., library and encyclopedia); (4) entertainment services. For example, upon entering a museum, information about exhibits, resources, and staff can be retrieved from computers located at kiosks near the entrance or throughout the museum. The amount of instructional information can be very large due to the fact that a large number of graphics and videos may be used.

A prototype version of the server system has been built using Windows 95 PC clients running the ActiveMovie application to view videos, and a miss server that runs on Linux 2.0 to retrieve the videos. The instructional server provides small video clips (varying from about 20 seconds and 4 MB to about 180 seconds and 50 MB each) to its clients.

Clients are constructed as follows: The clients are modified to use a lightweight network protocol to communicate with the hit server. The protocol is implemented as a Vxd element that communicates directly with the NDIS adapter driver. An ActiveMovie source filter is included which transfers ActiveMovie requests into "get" requests to the network protocol. The ActiveMovie source filter requests a series of video blocks that correspond to a consecutive intervals of the video. The size of each block is 32 KBytes.

The miss server may be implemented as follows: The instructional miss server was created from a miss server library containing the primitive operations. The miss server executes as a user process on Linux 2.0. The lightweight network protocol is incorporated into the Linux kernel. The serve_miss function is used to handle misses. Application-specific policy is added to: (1) download of video items using HTTP and (2) implement a custom cache replacement policy. First, a special "get-item" operation for video items was created. This function returns only the source of the HTTP item, but not the header. An item type of video is specified to indicate the use of this "get-item" operation (e.g., video:http://video.mpg). A representative function which has been defined is to implement the largest-item-first replacement policy (called custom_replace). This largest-item-first policy was shown to perform well for web proxy caches. The custom cache replacement function maintains a heap of pointers to all item descriptors in increasing size order. Whenever an item is to be removed, the largest item from the cache is selected.

2. Web Publishing Server

A web publishing server is a server that forwards periodic updates of information to its clients. Clients download such information as desired. This type of server is useful for monitoring status (e.g., stock prices and factory production) and directed updates (e.g., workflow activities and asynchronous agents). Currently, such applications are implemented on centralized servers that may be remotely located. When a client wants an update, it requests the update from the server. Since many clients on the same LAN may request the same information (e.g., brokers in a financial institution requesting stock quotes), it makes sense to cache the responses on a machine on the LAN. The foregoing has been demonstrated using a server system on a Windows 95 PC client running the Netscape Navigator 3.0 browser with another miss server running on Linux 2.0. As with the previous server system example, the clients are modified to use the lightweight network protocol for communicating with the hit server. Also, an HTTP proxy is added to the client to redirect browser requests to the Vxd element that implements the network protocol. The browser's HTTP Proxy field is set to use the custom HTTP proxy. The miss server is implemented with custom prefetching and cache management to retrieve updates. At prescribed times the miss server fetches updates from pre-defined sites. The custom cache replacement policy sorts these items by expiration time. When a replacement is necessary, items whose expiration times have passed are removed. If not enough of such items are available for removal, then items are removed using a traditional algorithm (e.g., LRU). This miss server also supports the annotation of executable items with a security policy that describes the access rights that should be used when executing these items. The security policy for an item is precompiled into the item data. A modified Java virtual machine has been implemented that can accept and enforce such policy upon downloaded Java applets. Using the inventive server architecture to build such applications enables the development of application-specific miss servers that can determine when to fetch updates and how to manage the cache for LAN clients. For example, a financial server can scan a variety of resources for updated financial information. Clients can download the information at whatever time intervals they choose. Using application-specific knowledge, the miss server can replace items that are no longer valuable. In addition, the miss server can create archival items from the original data.

The invention has been described with reference to several specific embodiments. One having skill in the relevant art will recognize that modifications may be made without departing from the spirit and scope of the invention as set forth in the appended claims.

Having thus described our invention, what is claimed as new and desire to secure by Letters Patent is:

1. A server system comprising:
   at least one first server, comprising a generic cache component having at least one cache of items associated therewith, for receiving user requests for performing operations on said items, for determining if user requests relate to items stored at said at least one cache, for determining and executing the item-specific operations for the user requests which relate to said stored items, and for executing default operations for the user requests for items not stored at said at least one cache, said default operations including relaying said user requests to at least one application-specific second server; and
   at least one second application-specific miss server in communication with said at least one first server for receiving item-specific operation requests from the at least one first server, for implementing application-specific policies for the distribution of items to clients by executing said item-specific operation requests directly or by linking to one of a plurality of other servers from which non-cached items can be obtained; and for implementing application-specific policies for managing the at least one cache at said at least one hit server.

2. The server system of claim 1 wherein first and second servers execute on different processors and further comprising a server interconnection system connecting said first and said second servers.

3. The server system of claim 2 wherein said server interconnection system comprises a closed network.

4. The server system of claim 2 wherein said server interconnection system comprises a bus system.

5. The server system of claim 1 further comprising at least one memory location shared by said first and second servers.

6. The server system of claim 1 wherein said first and said second servers execute on a common processor.

7. The server system of claim 2 further comprising at least one memory location shared by said first and second servers.

8. A method for a server system, comprising at least one first server having at least one cache for storing a plurality of items and at least one second server, to respond to user requests comprising the steps of:
   receiving a user request at one of said at least one first server;
   determining at said one of said at least one first server if said user request relates to an item stored at said at least one cache;
   determining the item-specific operations for the user request at said one of said at least one first server;
   executing said item-specific operations on said item stored at said at least one cache;
   relaying an item-specific operation request relating to said user request from said at least one first server to at least one of said at least one application-specific second server if said user request does not relate to an item stored at said at least one cache;
   responding to said relayed item-specific operation request by implementing application-specific policies for the distribution of items to clients by executing item-specific operations at one of said at least one application-specific second server; and
   said at least one application-specific second server implementing application specific policies for managing the at least one cache at said at least one hit server.

9. The method of claim 8 further comprising generating and relaying an item-specific operation request relating to said user request when the estimated processing time for executing the item-specific operation at said one of said at least one first server exceeds a threshold time.

10. The method of claim 8 wherein said relaying said user request from one of said at least one first server to at least one of said at least one second server comprises broadcasting said user request to all of said at least one second server.

11. The method of claim 8 wherein said relaying said user request from one of said at least one first server to at least one of said at least one second server comprises transmitting said user request to less than all of said at least one second server.

12. The method of claim 8 wherein said responding to said user request comprises operating on less than all of said cached item.

13. The method of claim 8 wHerein said responding to said relayed user request comprises operating on less than all of a non- cached item.

14. The method of claim 8 wherein at least one item-specific operation is stored with said at least one item in said at least one cache and wherein responding to said user request comprises the steps of:

accessing said item-specific operation from said at least one cache; and responding to said user request by applying said item-specific operation to said item.

15. The method of claim 12 wherein at least one item-specific operation is stored with said at least one item in said at least one cache and wherein responding to said user request comprises the steps of:

accessing said item-specific operation from said at least one cache; and responding to said user request by applying said item-specific operation to less than all of said item.

16. The method of claim 8 further comprising the step of verifying user access to said server.

17. The method of claim 8 further comprising the step of verifying user access to said at least one item.

18. The method of claim 8 further comprising the step of encrypting communications between said server and said user.

19. The method of claim 8 further comprising performing coherency operations for items operated upon.

20. The method of claim 14, wherein said item-specific operations include coherency operations, further comprising the steps of:

accessing said item-specific coherency operations; and performing said item-specific coherency operations for said items.

21. The method of claim 8 further comprising generating and relaying an item-specific operation request relating to said user request when the item-specific operation is pre-empted at said one of the at least one first server by higher priority item-specific operations for at least one other user request.

\* \* \* \* \*